(12) United States Patent
Lopez et al.

(10) Patent No.: US 8,612,698 B2
(45) Date of Patent: Dec. 17, 2013

(54) REPLACEMENT POLICY FOR HOT CODE DETECTION

(75) Inventors: Pedro Lopez, Molins de Rei (ES); F. Jesús Sánchez, Barcelona (ES); Josep M. Codina, Llobregat (ES); Enric Gibert, Sant Cugat del Vallès (ES); Fernando Latorre, Huesca (ES); Grigorios Magklis, Barcelona (ES); Pedro Marcuello, Barcelona (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 953 days.

(21) Appl. No.: 12/263,418

(22) Filed: Oct. 31, 2008

(65) Prior Publication Data

US 2010/0115247 A1 May 6, 2010

(51) Int. Cl.
*G06F 13/00* (2006.01)
*G06F 13/28* (2006.01)

(52) U.S. Cl.
USPC .............. 711/159; 711/133; 711/E12.069

(58) Field of Classification Search
None
See application file for complete search history.

(56) References Cited

U.S. PATENT DOCUMENTS

| 6,425,057 B1 * | 7/2002 | Cherkasova et al. .......... 711/134 |
| 2008/0225740 A1 * | 9/2008 | Martin et al. ................. 370/252 |

* cited by examiner

*Primary Examiner* — Reginald Bragdon
*Assistant Examiner* — Eric S Cardwell
(74) *Attorney, Agent, or Firm* — Blakely, Sokoloff, Taylor & Zafman LLP (57) ABSTRACT

Methods and apparatus relating to a replacement policy for hot code detection are described. In some embodiments, it may be determined which entry amongst a plurality of entries stored in storage unit is to be replaced next. The entries may correspond to hot code and may store age and execution frequency information corresponding to the hot code. Other embodiments are also described and claimed.

18 Claims, 6 Drawing Sheets

REPLACEMENT POLICY FOR HOT CODE DETECTION

FIELD

The present disclosure generally relates to the field of electronics. More particularly, an embodiment of the invention relates to a replacement policy for hot code detection.

BACKGROUND

Hot code generally refers to the most frequently executed portions of a program. Some implementations may use techniques to optimize these hot (or frequently executed) pieces of code, because it may be less costly and efficient than optimizing the whole program. However, detecting hot code may not be a trivial.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Additionally, the use of "instruction" or "micro-operation" (which may also be referred to as "uop") herein may be interchangeable. Also, even though some embodiments discussed herein may refer to a set or clear value as logical 0 and 1, respectively, these terms are interchangeable, e.g., depending on the implementation.

Some embodiments provide for a replacement policy for hot code detection (e.g., implemented in hardware or software) which provides improved performance and/or increased efficiency. In an embodiment, hot code detection may be performed based on counter values that record the dynamic execution frequency of static code during program execution. Generally, programs may have numerous static instructions but only a small percentage of these instructions may account for the vast majority of dynamic instructions executed (also referred to as 90/10 rule of thumb). Accordingly, based on information stored, e.g., in a table, the cost of the hardware profiling structure may be significantly reduced, in part, because storage is provided for a relatively very small percentage of the whole instruction footprint of a program.

Figure 1:
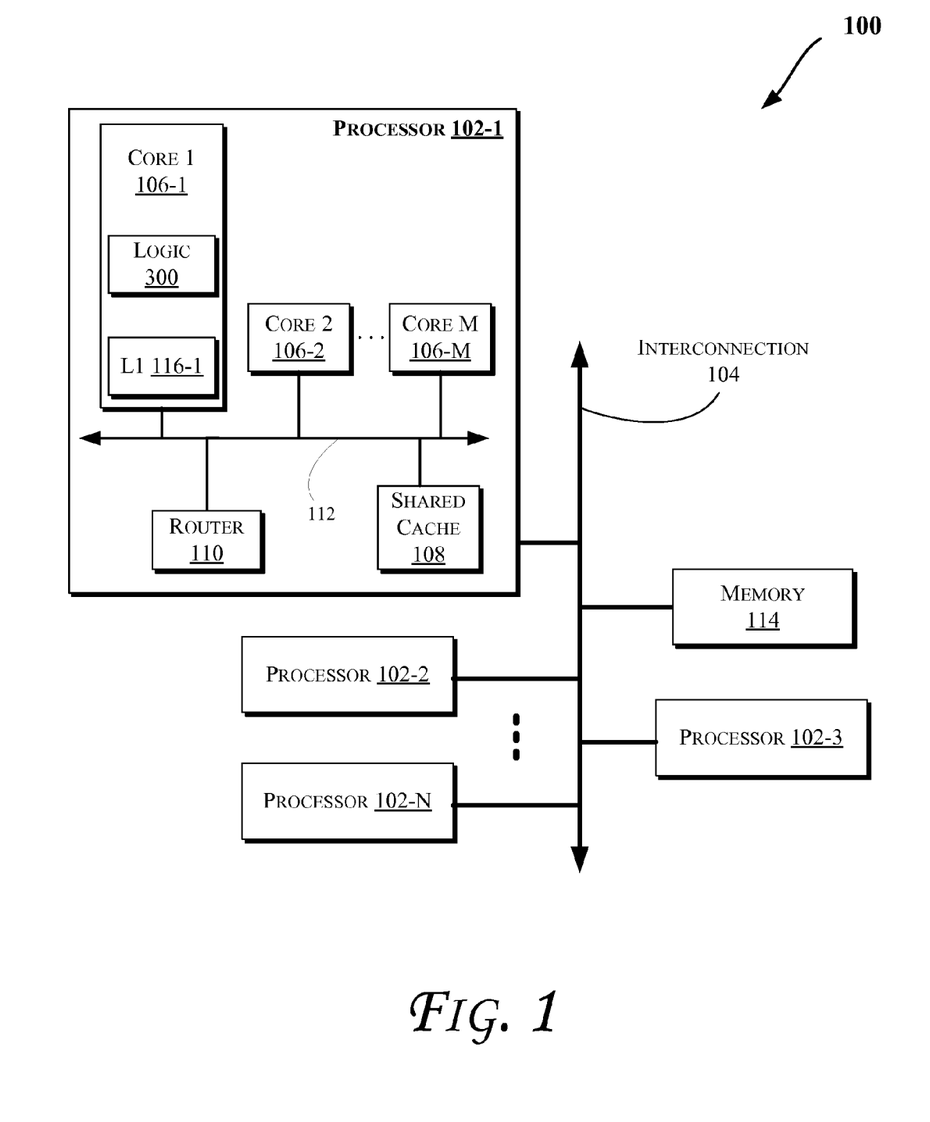
FIGS. 1, 5, and 6 illustrate block diagrams of embodiments of computing systems, which may be utilized to implement various embodiments discussed herein.

Techniques described herein may allow for improved performance in various computing devices, such as those discussed for example with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116") and/or an L2 cache (not shown). As shown, processor core 106 may include a logic 300 which will be further discussed herein, e.g., with reference to FIG. 3. Furthermore, even though some figures illustrate logic 300 to be inside a processor or core, logic 300 may be provided within other components of computing systems discussed herein, such as within components of systems discussed with reference to FIG. 1, 5, or 6.

Figure 2:
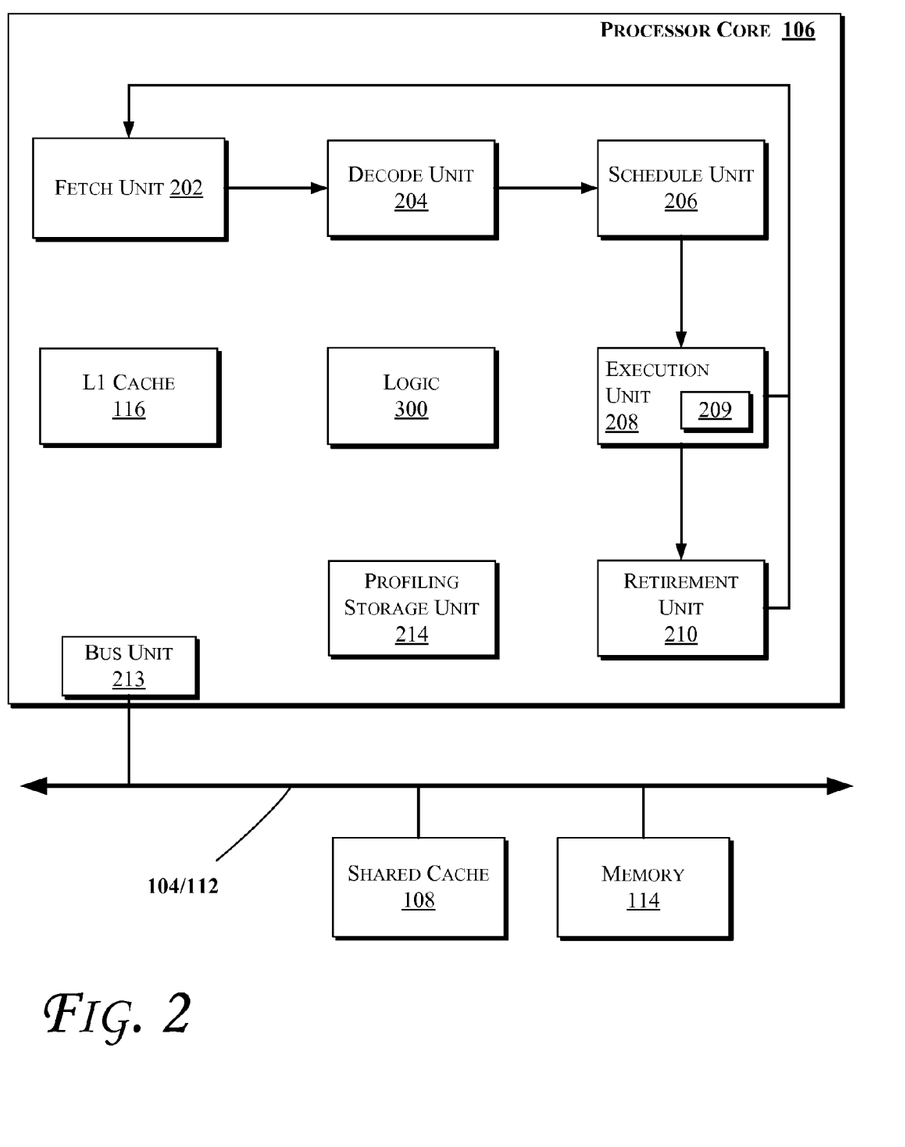
FIG. 2 illustrates a block diagram of portions of a processor core and other components of a computing system, according to an embodiment of the invention.

FIG. 2 illustrates a block diagram of portions of a processor core 106 and other components of a computing system, according to an embodiment of the invention. In one embodiment, the arrows shown in FIG. 2 illustrate the flow direction of instructions and/or data through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 5 and 6. The core 106 may optionally include a decode unit 204 to decode the fetched instruction. In an embodiment, the decode unit 204 may decode the fetched instruction into a plurality of uops (micro-operations). Some embodiments of the processor core 106 may not include decode unit 204. Hence, the core 106 may process instructions without decoding them. Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution (e.g., in accordance with information provided by logic 300 which will be further discussed herein, e.g., with reference to FIG. 3). The execution unit 208 may execute the dispatched instructions after they are decoded (e.g., by the decode unit 204) and dispatched (e.g., by the schedule unit 206). In an embodiment, the execution unit 208 may include more than one execution unit, such as one or more memory execution units, one or more integer execution units, one or more floating-point execution units 209, or other execution units. The execution unit 208 may also perform various arithmetic operations such as addition, subtraction, multiplication, and/or division, and may include one or more arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. Also, each core 106 may be capable of executing multiple threads simultaneously (SMT or Simultaneous Multi-Threading). The core 106 may also include a retirement unit 210. The retirement unit 210 may retire executed instructions (e.g., in order) after they are committed. In an embodiment, retirement of the executed instructions may result in processor state being committed from the execution of the instructions, physical registers used by the instructions being de-allocated, etc.

Additionally, the core 106 may include a bus unit 213 to allow communication between components of the processor core 106 and other components (such as the components discussed with reference to FIG. 1) via one or more buses (e.g., buses 104 and/or 112). As shown, the core 106 may also include an profiling storage device or unit 214 (e.g., to store information about hot code instructions (or uops) for access by the logic 300). Alternatively, another storage device (e.g., L1 cache 116, shared cache 108, etc.) may be used to store the information relating to hot code.

Figure 3:
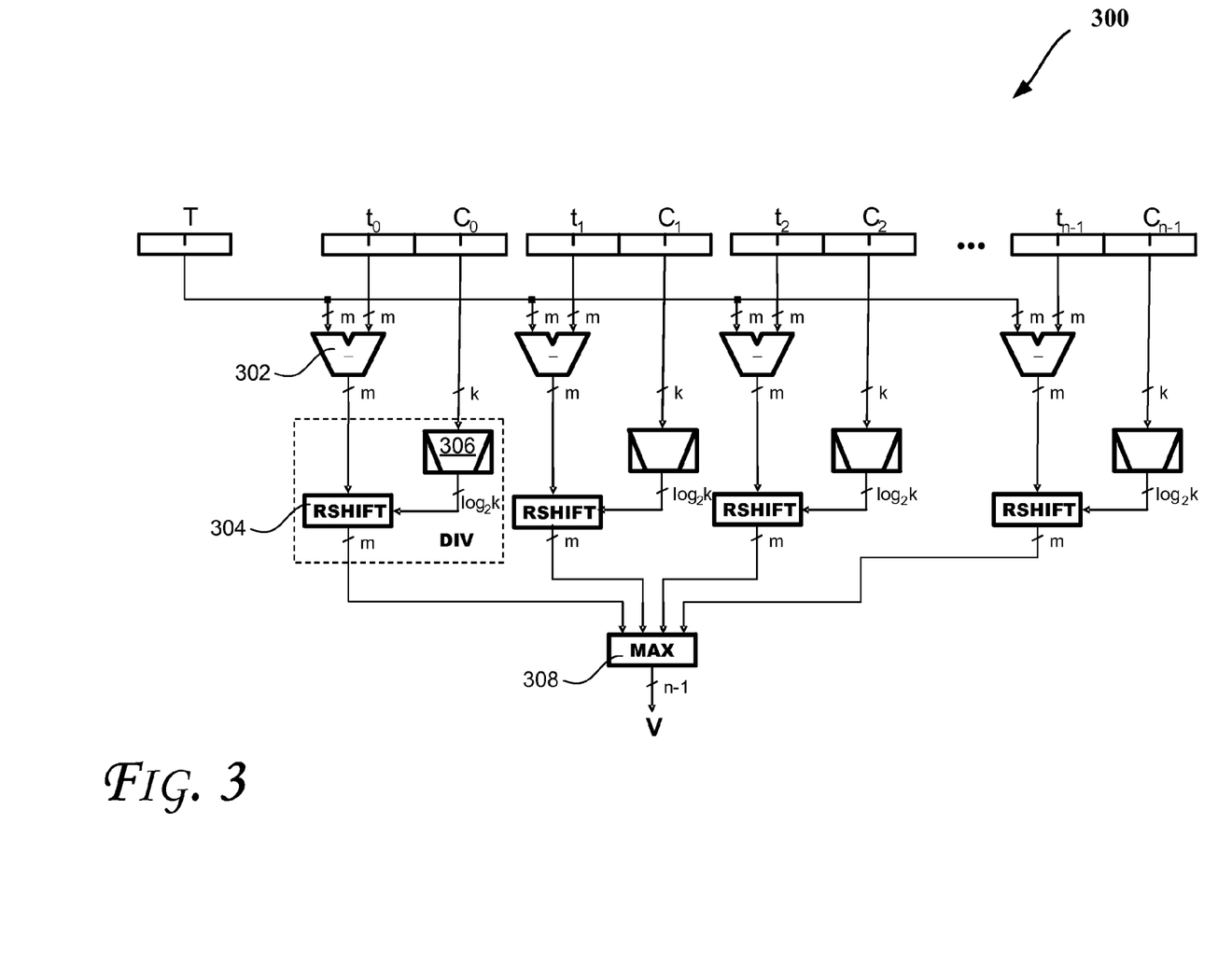
FIG. 3 illustrates a block diagram of a logic to identify a victim (V) entry for replacement, according to an embodiment.

FIG. 3 illustrates a block diagram of a logic 300 to identify a victim (V) entry for replacement, according to an embodiment. As discussed with reference to FIGS. 1-2 and 5-6, logic 300 may be provided in a processor or a processor core. However, in some implementations, logic 300 may be provided within other components of computing systems discussed herein, such as within one or more components of systems discussed with reference to FIG. 1, 5, or 6.

Generally, computer programs may have thousands of static basic blocks. This implies that one would need a large structure to record all this information. Although the profiler structure may not be in the critical path of the processor since it works independently and in parallel with the instruction pipeline, its cost in terms of area and power could be prohibitive. Using a limited number of entries may however incur some important drawbacks such as: (1) some hot basic blocks may not be detected due to evictions, and (2) some others may be detected too late to benefit from them (for instance, if this scheme is used to perform dynamic binary optimization, one would like to know that a basic block is hot the first time it appears). To this end, some embodiments significantly reduces the number of required entries (for example, 64-128 entries are enough, as discussed later) and allows the processor to detect hot code just in time to take advantage of it.

In one embodiment, the recent uses of basic blocks may be observed and their execution frequencies may be taken into account, e.g., based on information stored in the storage unit 214 of FIG. 2. In one embodiment, the storage unit 214 may store entries (e.g., in a table) where each entry (of the table) includes: a time value corresponding to the last access to the instruction, and a value associated with the number of executions of the instruction (a count value). Furthermore, in order to index entries of the profiling storage (or counters), the logical address of the instruction after a branch (either taken or not taken) may be used in some embodiments, e.g., by indicating that a given instruction corresponds to the starting address of a basic block. Some bits from the address (or combination of them) may be selected in order to index the set of the structure to be accessed. In an embodiment, each entry of the table may also include an index value.

In an embodiment, the algorithm used to select a victim (e.g., for eviction from the storage unit 214 of FIG. 2) is as follows: the way selected corresponds to the one with the highest ratio of the elapsed time since the corresponding entry was last used (age) and the number of times it has been used (frequency) (for example, the lowest number of times it has been used in an embodiment). We cell this relationship the CRFU (Coefficient of Recently-Frequently Used) factor and its value is computed by the following expression for a given way i:

$$CRFU_i = \frac{T - t_i}{C_i}$$

In the above expression, T is the current absolute time (e.g., which may be implemented as number of clock cycles, number of instructions that are executed, a clock value, etc.) at the eviction moment, $t_i$ is the last (absolute) time way i was accessed (e.g., the corresponding instruction was executed) and $C_i$ is the number of times way i has been accessed since it last entered (e.g., was allocated an entry in) the profiler cache (e.g., storage unit 214). In some embodiments, when a basic block is evicted, we loose its information and its counter is set to 1 when it reenters the cache again. Instead of time, we could use the number of accesses to the hardware profiling cache, but for the sake of simplicity we will use time for the rest of this document. Thus, an embodiment gives priority to instructions that are very frequently executed in a very short period of time, and instructions that are common during a long period of time. Note that the first type includes the ones that are frequently executed during the whole program execution.

The CRFU factor may only be accessed when an entry is to be evicted (e.g., due to lack of space in the profiler storage (e.g., storage unit 214)). Further, all ways of the affected set may be candidates to be replaced. The CRFU value may be calculated for each way in the set using the previous expression and the one with the highest value is considered as the victim. Table 1 below indicates the meaning of the relative value of CRFU.

TABLE 1

CRFU meaning

| $CRFU_i$ Value | Means |
|---|---|
| Low | Frequently or very recently used entry |
| High | Infrequently or not used for a long time entry |

In some implementations, the CRFU expression above may be computationally expensive, e.g., because of the division operation. For this reason, another embodiment is discussed below which may increase efficiency. The simplification consists of dividing by a power of two, which is implemented as a shift operation. The power of two is the result of truncating the value of the counter ($C_i$), which may be done by a priority encoder (e.g., item 306 of FIG. 3). For instance, if the value of the counter is 00101101, the divisor that is used is 00100000=$2^5$. In other words, the proposed simplification is:

$$pCRFU_i = \frac{T - t_i}{2^{\lfloor log_2 C_i \rfloor}}$$

Referring to FIG. 3, the pseudo-CRFU (pCRFU) for a particular profiler cache with n ways (i.e., way 0 through n−1) are shown. When a replacement in the profiler storage unit 214 is needed (e.g., because a given address is not found in the corresponding set, and there is no invalid entry), the pCRFU is computed by the logic 300 for each entry in that set. The entry selected as victim (V) to be replaced corresponds to the entry with the maximum pCRFU value.

As shown a subtraction logic 302 may provide the value for the upper portion of pCRFU value (i.e., T−$t_i$). A shifter 304 may right-shift the output of the logic 302 by the output of the priority encoder 306 (derived from the corresponding counter value). Next, a comparator logic 308 may determine the largest value output by the shifters (304).

In some embodiments, the proposed replacement technique improve the coverage of hot instructions by a factor of two, for example, when compared to conventional replacement policies such as LRU (Least Recently Used), LFU (Least Frequently Used), or random. At the same time, when compared with more complex schemes (e.g., typically implemented in software and used for web caching or page management), the performance in terms of hot code coverage may be similar, but the approach to compute the victim line to replace is much simpler and also more suitable for a hardware implementation as discussed with reference to FIG. 3, for example.

Furthermore, some current replacement policies used in data or instruction caches are not well-suited to handle replacement for hot block detection. For example, with a Least Recently Used (LRU) policy, problem arises when programs have a lot of basic blocks and we are using a table with low associativity (e.g., 4-way or less). In this scenario, hot basic blocks could go undetected because less important ones are pushing them out of the table. Basically, LRU does not prioritize the most executed instructions, but the most recent ones. Also, with a Least Frequently Used (LFU) policy, the situation may be the opposite; namely, we are not offering opportunities to new future hot entries. Instead, LFU is over-protecting the most frequently executed instructions up to current time, which may not be the most frequently executed instructions at the end of the program.

Moreover, in some embodiments, a set-associative cache (or other type of a storage device) may be used to store the dynamic execution count of code blocks. For example, if a block is not present in the cache when it is executed, then one entry may be allocated (evicting an entry if it is necessary) and its value is set to 1. If the block has a previously allocated entry, then its value is modified (e.g., incremented by 1). When a block is executed more frequently than a given threshold value, then the block is considered hot code. The threshold value determines the coverage of the selected blocks. The higher the threshold, the lower the number of block that overpass it, and the lower the coverage that these blocks represent in terms of executed dynamic instructions. In an embodiment, a threshold of the order of 100,000 may be adequate for coverage greater than 90% for most programs, while these blocks only represent less than 10% of the static binary.

Figure 4:
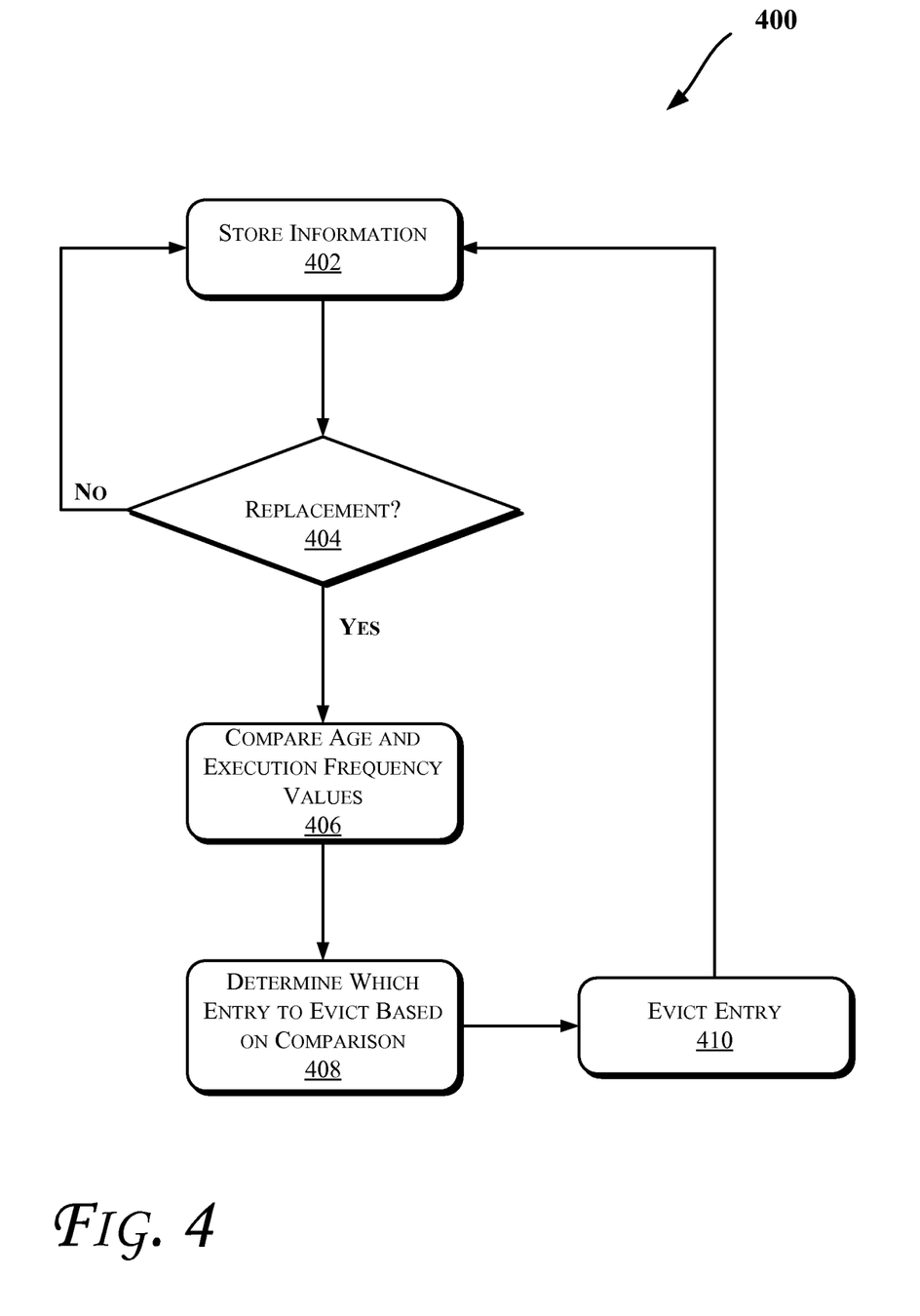
FIG. 4 illustrates a flow diagram of a method in accordance with an embodiment of the invention.

FIG. 4 illustrates a flow diagram of a method 400 to disable a portion of a cache during low voltage operations, according to an embodiment of the invention. In some embodiments, various components discussed with reference to FIGS. 1-3 and 5-6 may be utilized to perform one or more of the operations discussed with reference to FIG. 4.

Referring to FIGS. 1-4, at an operation 402, information (such as age, execution frequency, address, index, etc.) corresponding to an executed instruction right after a branch (e.g., based on a signal from the execution unit 209 or retirement unit 210) may be stored in a storage unit (e.g., storage unit 214). At an operation 404, it may be determined whether any of the entries are be replaced or evicted (e.g., from a cache or storage unit 214 such as discussed with reference to FIGS. 2-3 due to lack of space, etc.). If replacement is to be made, an operation 406 (e.g., logic 300) may compare age and execution frequency values of the store entries. An operation 408 (e.g., logic 308) may determine the entry with the highest value of CRFU (or pCRFU). At an operation 410, the determined entry is evicted or replaced.

Figure 5:
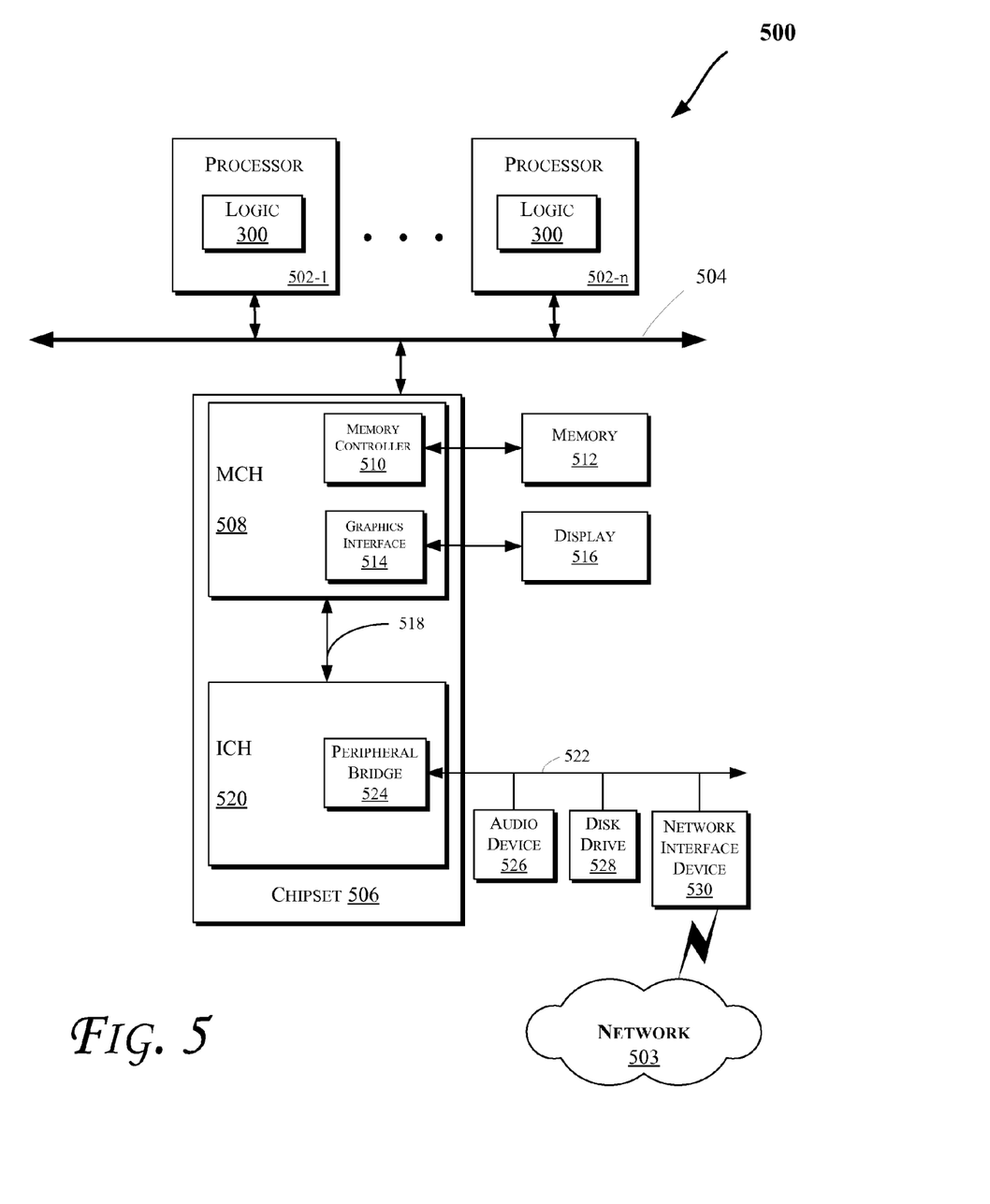

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include one or more of the caches, storage devices (e.g., storage unit 214), and/or logic 300 discussed with reference to FIGS. 1-4. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and other components shown in FIG. 5 (including but not limited to the MCH 508, one or more components of the MCH 508, etc.) may be combined to form a single chip. Furthermore, a graphics accelerator may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
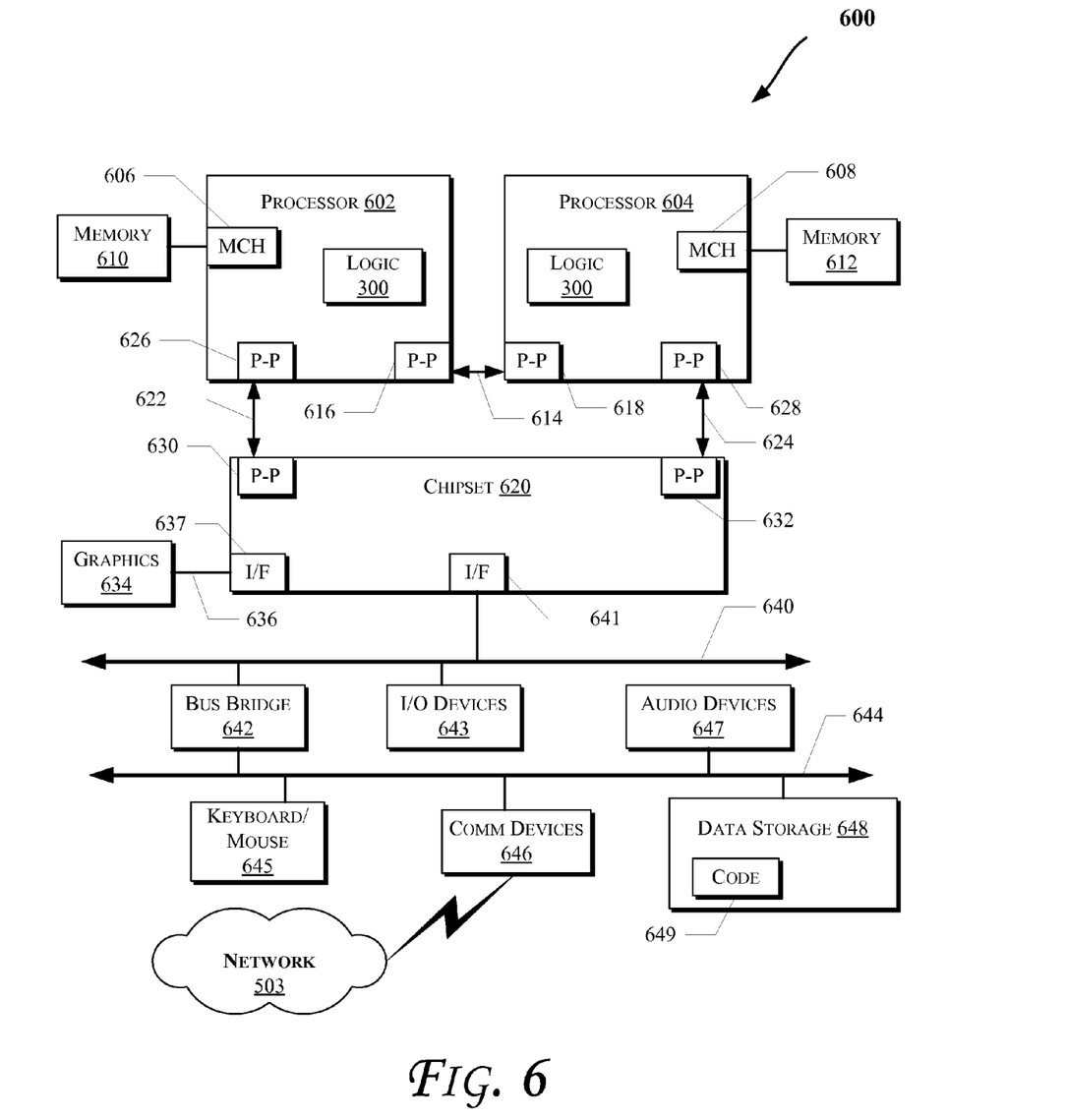

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5, e.g., including one or more of the caches discussed with reference to FIGS. 1-5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, one or more of the cores 106 of FIG. 1 may be located within the processors 602 and 604. Also, processors 602 and 604 may include one or more of the caches, storage devices (e.g., storage unit 214), and/or logic 300 discussed with reference to FIGS. 1-5. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
a storage unit having a plurality of entries, wherein each entry of the plurality of entries is to store information corresponding to an age and execution frequency of one of a plurality of instructions; and
a first logic to detect which one of the plurality of entries is to be evicted from the storage unit based on a comparison of the age and execution frequency of each of the plurality of instructions, wherein the age of each of the plurality of instructions is to be determined based on a difference between a current time value and a last time value, wherein the last time value is to correspond to a time when an associated instruction was executed last, and wherein the comparison of the age and execution frequency of each of the plurality of instructions includes, for each entry of the plurality of entries, dividing the corresponding age by the corresponding execution frequency to determine a corresponding Coefficient of Recently-Frequently Used (CRFU).

2. The processor of claim 1, wherein the first logic is to cause eviction of one of the plurality of entries from the storage unit with a highest age and lowest execution frequency value.

3. The processor of claim 1, wherein the execution frequency of each of the plurality of instructions is to be determined based on a number of times a corresponding instruction has been executed since a corresponding entry was allocated in the storage unit.

4. The processor of claim 1, wherein the execution frequency of each of the plurality of instructions is to be determined based on a truncated value of a number of times a corresponding instruction has been executed since a corresponding entry was allocated in the storage unit.

5. The processor of claim 1, wherein the first logic is to comprise a plurality of subtraction logics, a plurality of priority encoders, a plurality of shifters, and a comparator logic.

6. The processor of claim 1, wherein entries in the storage unit, corresponding to the plurality of instructions, are to be indexed based on a logical address of an instruction.

7. The processor of claim 1, wherein the storage unit is to comprise one or more of a level 1 cache, a mid-level cache, or a last level cache.

8. The processor of claim 1, further comprising one or more processor cores, wherein at least one of the one or more processor cores is to comprise the first logic.

9. The processor of claim 1, further comprising one or more processor cores, wherein at least one of the one or more processor cores is to comprise the storage unit.

10. A method comprising:
storing a plurality of entries in a table, wherein each entry of the table is to store information corresponding to an age value and an execution frequency value of one of a plurality of instructions;
determining which one of the plurality of entries is to be replaced next based on a comparison of the age value and the execution frequency of each of the plurality of instructions; and
for each entry of the plurality of entries, dividing the corresponding age value by the corresponding execution frequency value to determine a corresponding Coefficient of Recently-Frequently Used (CRFU).

11. The method of claim 10, wherein determining which one of the plurality of entries is to be replaced next is to be performed based on a comparison of a plurality of CRFUs.

12. The method of claim 10, further comprising replacing an entry with a highest CRFU.

13. A computing system comprising:
a memory to store an instruction; and
a processor core to execute the instruction, the processor core to comprise a cache having a plurality of entries, wherein each entry of the plurality of entries is to store information corresponding to an age value and an execution frequency value of one of a plurality of instructions; and a logic to detect which one of the plurality of entries is to be replaced next based on a comparison of a plurality of Coefficient of Recently-Frequently Used (CRFU) values, wherein each of the CRFU values is determined based on a division of the age value by the execution frequency value of each of the plurality of instructions.

14. The system of claim 13, wherein the age value for each of the plurality of instructions is to be determined based on a difference between a current time value and a last time value, wherein the last time value is to correspond to a time when an associated instruction was executed last.

15. The system of claim 13, wherein the execution frequency value for each of the plurality of instructions is to be determined based on a number of times a corresponding instruction has been executed since a corresponding entry was allocated in the cache.

16. The system of claim 13, wherein the execution frequency value for each of the plurality of instructions is to be determined based on a truncated value of a number of times a corresponding instruction has been executed since a corresponding entry was allocated in the cache.

17. The system of claim 13, wherein the cache is to comprise one or more of a level 1 cache, a mid-level cache, or a last level cache.

18. The system of claim 13, further comprising an audio device coupled to the processor core.

* * * * *